Nov. 26, 1946.　　T. R. GOLDSMITH　　2,411,784
MILLING CUTTER
Filed Nov. 30, 1942　　3 Sheets-Sheet 2
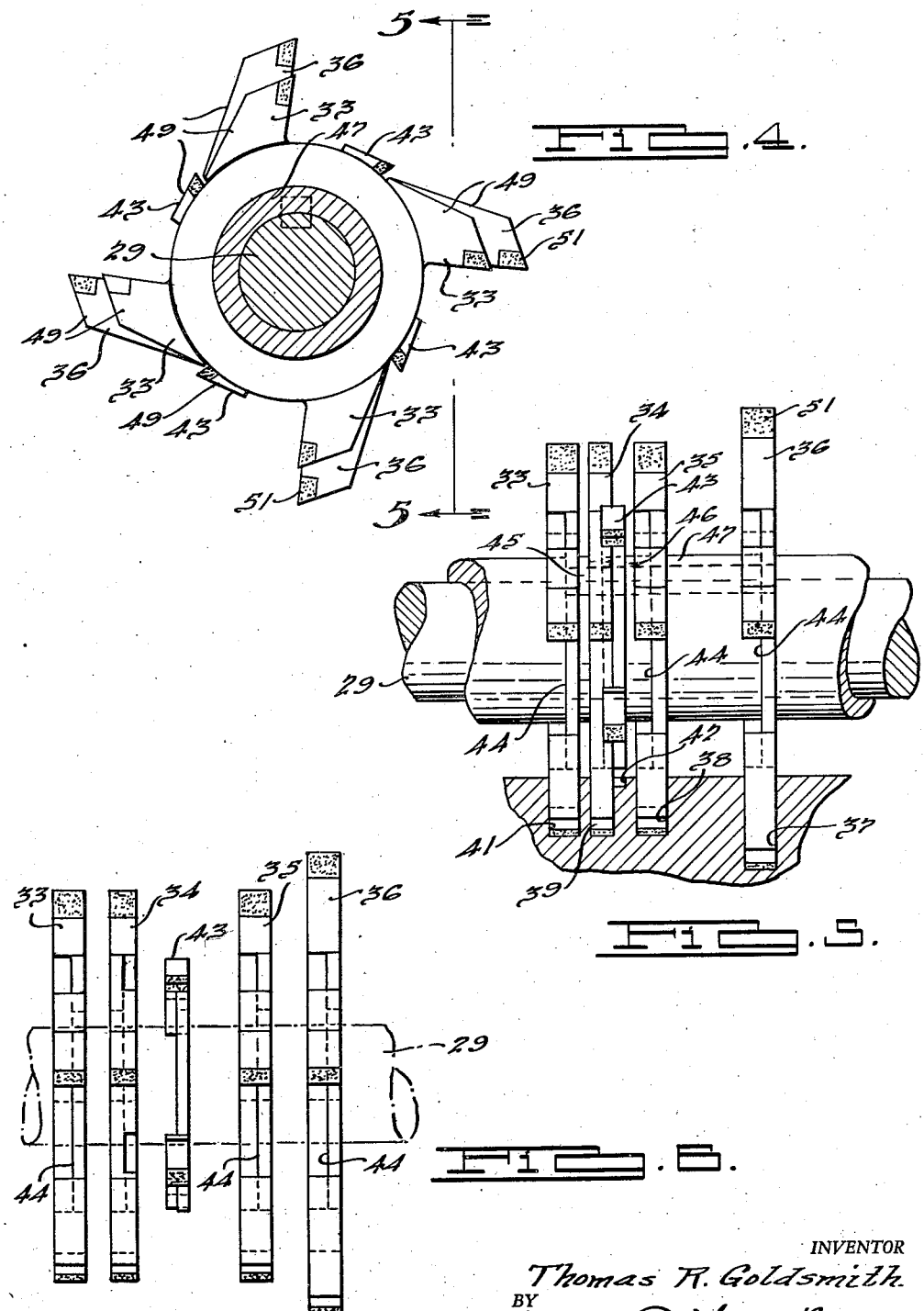
INVENTOR
Thomas R. Goldsmith.
BY
Harness, Dickey & Pierce.
ATTORNEYS.

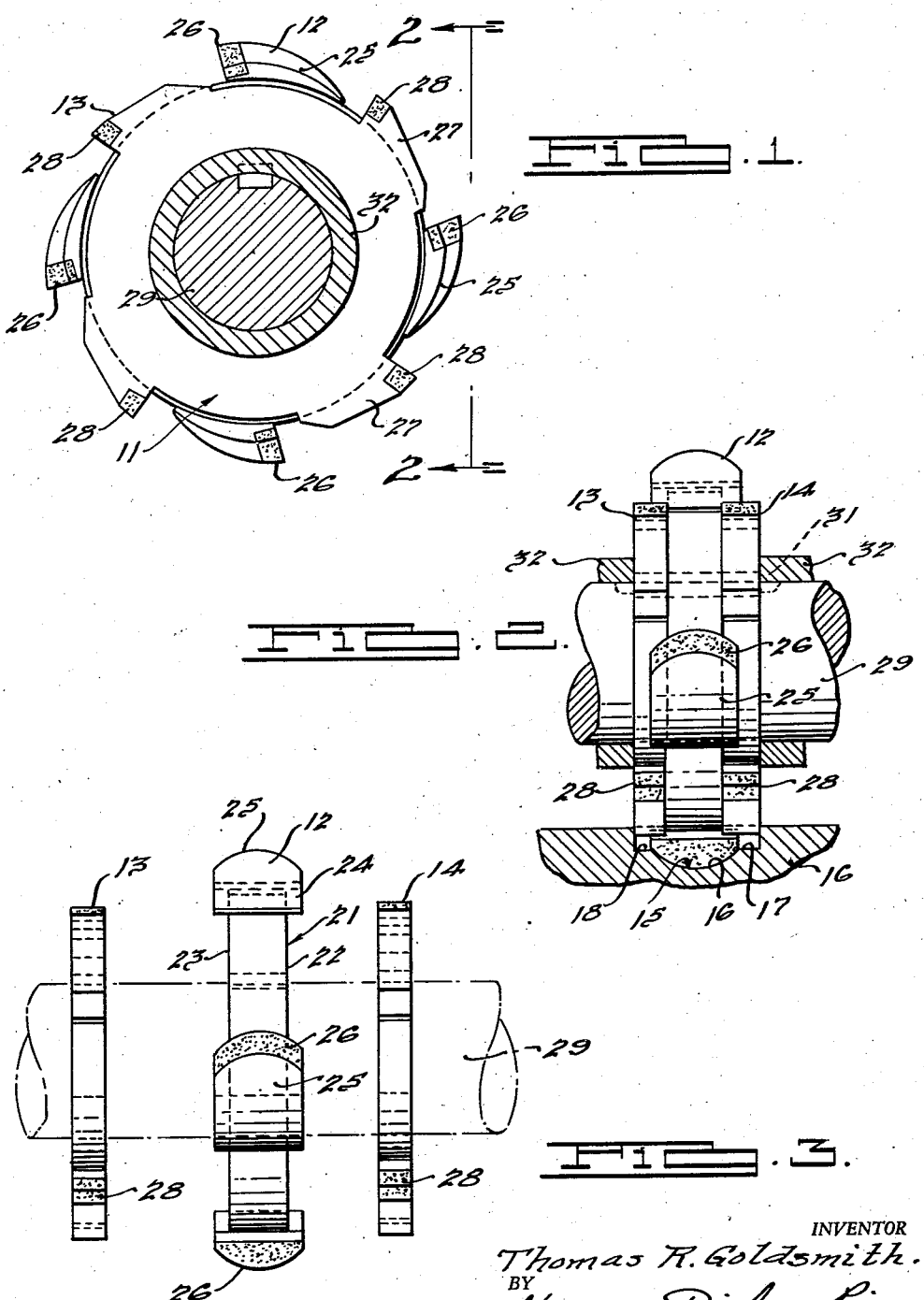

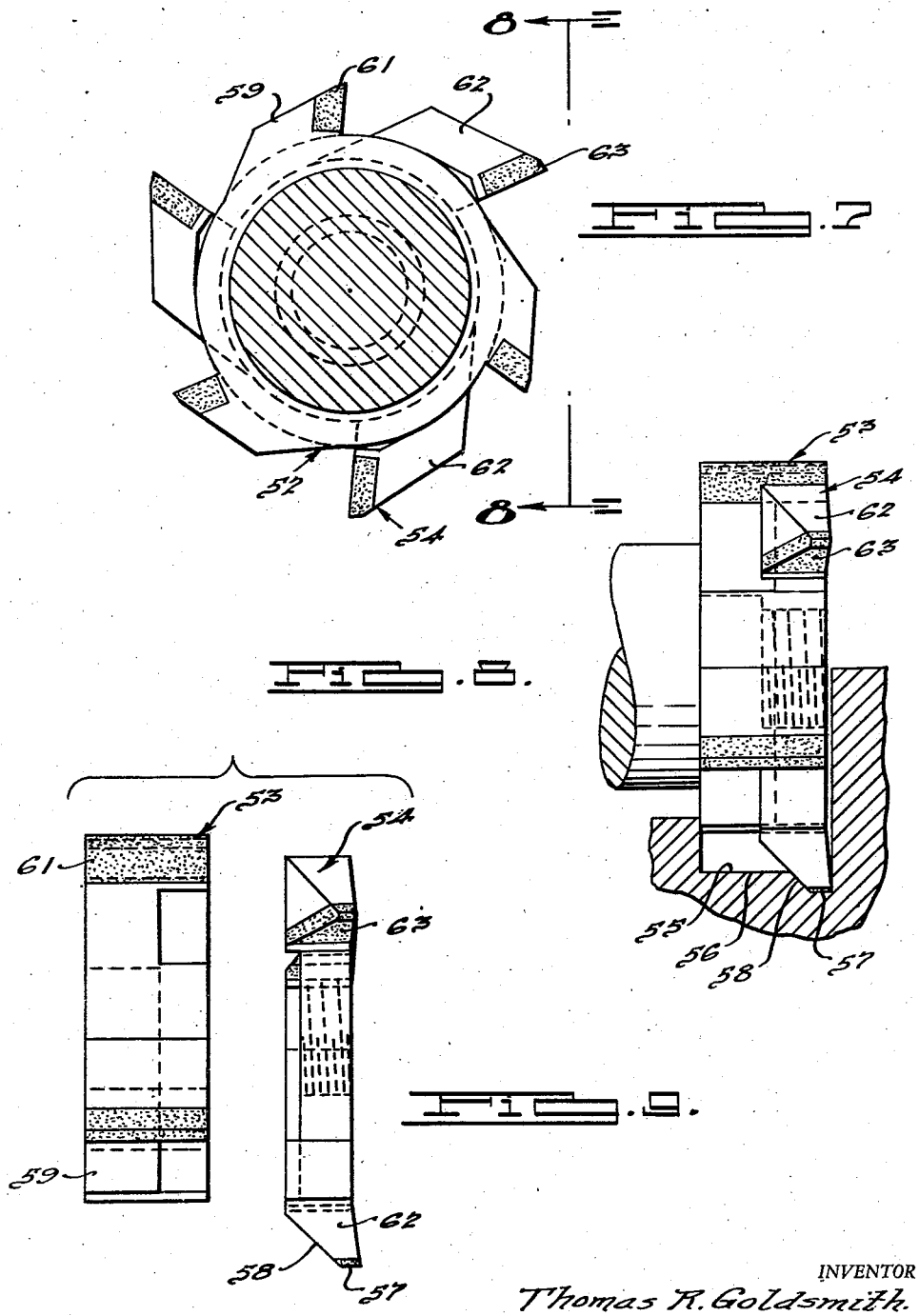

Patented Nov. 26, 1946

2,411,784

UNITED STATES PATENT OFFICE 2,411,784

MILLING CUTTER

Thomas Ralph Goldsmith, Buffalo, N. Y., assignor, by mesne assignments, to Super Tool Company, Macomb County, Mich., a partnership composed of Mrs. Sophie Birgbauer, Mrs. Ruth Schreck, Mrs. Gordon Birgbauer, and Mr. Gordon Birgbauer Application November 30, 1942, Serial No. 467,327

3 Claims. (Cl. 29—103)

This invention relates to tools of the milling cutter type, and particularly to a built-up milling cutter having the cutting edges tipped with hardened cutting material in a manner to simplify the grinding of the cutting edges.

While no particular problem is presented in tipping the cutting edges of tools with a hard cutting material, such as tungsten carbide, titanium carbide, Stellite, and the like, nevertheless the tipping of milling cutting tools having form cutting edges has not been successful because of the difficulty in sharpening the tools after the edges become dulled. When a dove-tail, for example, is to be cut in a work-piece, the cutter will have a pair of offset flat cutting edges joined by a sloping cutting edge which presents a difficult grinding problem when the cutting edges become dull and require sharpening.

It is substantially impossible to grind the sloping edge without harming the spaced parallel edges or to preform the face of a grinding wheel to produce the form grinding of the edges. The problem of grinding form cutting edges of milling cutting tools is such a difficult one that tipped milling cutters were never, to applicant's knowledge, constructed for commercial application. Similarly, when an arcuate slot having flat shoulders adjacent thereto is to be cut in a workpiece being machined, it was found impossible to grind the arcuate and shoulder portions of the tool without deforming one or all of the edges.

It is one object of the present invention to so construct a milling cutter that the difficulty in grinding the cutting edges is entirely overcome.

It is a further object of the invention to divide a milling cutter for producing an irregular surface into cutting segments having teeth of a form which are readily ground and which when assembled produce the irregular surface desired.

It is a still further object of the present invention to divide the cutter into several cutter segments and to shim the segments apart to retain the width to the cutter after the sides have been ground when performing a sharpening operation.

A still further object of the invention is to employ a plurality of cutter segments with spaced teeth which interlock with each other and overcome the effect of employing a reduced number of teeth by increasing the speed of rotation of the cutter.

Other objects and features of novelty of the invention will be either specifically pointed out or will become apparent when referring, for a better understanding of the invention, to the following description taken in conjunction with the accompanying drawings, wherein:

Figure 1 is an end view in elevation of a segmental cutting tool having tipped teeth which embodies a feature of the present invention;

Fig. 2 is a side view of the tool illustrated in Fig. 1, as viewed from the line 2—2 thereof;

Fig. 3 is an exploded view of the cutter illustrated in Fig. 2, showing the various segments thereof;

Fig. 4 is an end view in elevation of a cutter, similar to that illustrated in Fig. 1, showing a further form which the invention may assume;

Fig. 5 is a side view of the cutter illustrated in Fig. 4, as viewed from the line 5—5 thereof;

Fig. 6 is an exploded view of the elements of the cutter illustrated in Fig. 5;

Fig. 7 is an end view in elevation of a tipped cutting tool, similar to that illustrated in Fig. 1, showing a still further form of the invention;

Fig. 8 is a side view of the tool illustrated in Fig. 7, as viewed from the line 8—8 thereof; and Fig. 9 is an exploded view of the tool illustrated in Fig. 8.

Referring to Figures 1 to 3, a cutting tool 11 is illustrated embodying a central cutting segment 12 and end segments 13 and 14. The tool 11 is employed for cutting a slot 15 in a piece of metal 16, as illustrated in Figure 2. The slot has a central arcuate portion 16 and adjacent flat shoulder portions 17 and 18. When the entire tool was made from a hard cutting material, it was found that several sharpenings a day were required to retain a sharp enough edge to cut the slot 15 in continuous production. In view of the fact that the setting up of the tool required considerable time, a material loss in production resulted therefrom. When attempting to apply a hard tip to the cutting edges it was found that it was substantially impossible to grind the arcuate and flat forms on the tool to any degree of precision and satisfaction. It was found that the tools could be made up from segments with the teeth of each segment having a simple form which could be readily ground so that the difficulties experienced in sharpening the tipped tool were thereby overcome.

Referring more particularly to Figure 3, it will be seen that the central segment 12 has a body portion 21 which is recessed at 22 and 23 inwardly of the width of the teeth 24. The teeth 24 have an arcuate surface 25 conforming to the shape of the arcuate portion 16 of the slot 15 to be cut by the tool. A tip 26 which is preferably made of Carboloy or other extremely hard material is sweated on the ends of the teeth 25, as illustrated more particularly in Figure 1. The arcuate surface 25 is then ground on the teeth with a desirable relief.

The tool segments 13 and 14 nest within the recesses 23 and 22, respectively, of the central tool segment 12. The tool segments 13 and 14 have teeth 27 which are provided with the tips of Carboloy 28 or other material as clearly disclosed in Figure 1. No problem is presented in sharpening the teeth 13 and 14 since they have flat surfaces at the ends and sides. After the teeth have been sharpened, the segments are clamped together, as illustrated in Figure 2, to provide an over-all cutting contour of a form to cut the slot 15 in the metal 16.

If it is found that by dressing the side faces of the segments 13 and 14 that the over-all dimension of the slot 15 has been reduced, shims may be provided between segments 13 and 14 and the body portion 21 of the central segment 12 to obtain the desired width. It was found that a tool made in this manner could operate continuously throughout a 24 hour day without requiring a sharpening operation. When the cutting edges become dull, it is a simple operation to grind the ends and sides of the teeth 27 of the cutter segments 13 and 14 and to grind the sides and the arcuate surface 25 of the central segment 12. These may again be assembled on a key 31 on the arbor 29 and be retained in abutted relation by the sleeves 32 in the conventional manner.

In Figures 4, 5, and 6, a bank of milling cutter tools is illustrated for cutting a plurality of slots in the workpiece. Cutter segments 33, 34, 35, and 36 are similar to the cutter segments 13 and 14 of Figures 1 to 3. The cutter segment 36 is of greater diameter to cut a slot 37 of greater depth than the slots 38, 39, and 41 cut by the segments 35, 34, and 33, respectively. The slot 39 has a shoulder 42 cut thereon by a cutter segment 43 of smaller diameter than the segment 34 with which the cutter nests.

The segments 33, 34, 35, and 36 of the cutters are undercut at 44 to receive other cutter segments when wider slots are to be cut in the material. It will be noted that the cutter segment 43 nests within the recess 44 of the cutter segment 34 so as to be capable of being sharpened and being shimmed outwardly so that the width of the slot 39 and shoulder 44 may be maintained. It is to be understood that the cutter segment 43 may be of the same diameter as the segment 34 so as to cut the same depth of slot 39 while being capable of maintaining the width of the slot when the two segments are shimmed apart after the side faces have been ground to produce a sharpening operation.

It will be noted that each of the segments 33, 34, 35, 36, and 43 are provided with four teeth where at least 8, 10, or 12 teeth would be provided in a normal cutter. This eliminates the difficulty of presenting a wheel to the cutting edges for the grinding operation, and reduces the number of cuts being taken in the slots during each revolution of the supporting arbor 29. To overcome this tendency of reducing the speed of the cutting operation, the rotation of the arbor 29 is increased to make up for the loss of teeth in each cutter so that the same number or more cuts are made by the teeth in the slot in the same length of time.

The tipped tool retains its cutting edges for a greater length of time in view of the hardness of the material so that a greater depth of cut can be made by each cutting tooth than by the cutting teeth of tools which are not tipped by the hardened material. Spacers 45, 46, and 47 separate the cutter segments 33, 34, 35 and 36 from each other. It will be noted from Figure 4 that all of the teeth 49 of the segments have Carboloy or similar tips 51 disposed in a recess in the end thereof in position to be employed as the portion having the cutting edges.

Referring to Figures 7 to 9, a cutter 52 is illustrated, made up of cutting segments 53 and 54. As illustrated in Fig. 8, the cutter 52 is employed for cutting a dove-tail slot 55 in a piece of metal. It will be noted that the parallel surfaces 56 and 57 are spaced from each other and joined by a sloping cutting edge 58. It was found substantially impossible to grind the sloping surface 58 of the hard tip material without interfering with or destroying the surface on the parallel edges 56 and 57. By separating the two segments 53 and 54, it will be seen that the sloping cutting edge 58 may be ground without interference with the end cutting edge 57 and that this can be readily done without requiring a lengthy set-up or the use of a preformed grinding face. This is also true of the segment 53 having the straight cutting edges.

The teeth 59 of the segment 53 are provided with a Carboloy tip 61 while the teeth 62 of the segment 54 have similar tips 63. Each segment is provided with three teeth and the fact that only three cuts are taken during one revolution of the arbor 29 has no bearing on the speed of operation of the cutter in view of increased speed of rotation of the arbor 29 and the depth of cut which may be taken because of the extremely hard tips on which the cutting edges are formed. Preferably each segment should have an even number of cutting teeth so that they can be accurately measured diametrically across the segment. When an odd number of teeth are provided, as illustrated in Figure 7, difficulty is experienced in accurately measuring the radii of the teeth.

While a dove-tail slot is illustrated in Figure 7 and an arcuate flat shouldered slot in Figure 2, as well as spaced slots in Figure 5, it is to be understood that any combination of segmental cutters having tipped teeth may be employed to produce any shape of slot or surface. This is possible when each of the segments has been selected to have teeth with cutting edges which may be ground directly by a standard grinding wheel without the necessity of preforming the face thereof. Width to the slots is maintained by shims which space the segments apart a distance equal to the amount of material ground from the side faces during a sharpening operation. The interlocking of the segments permits the increased spacing of the segments without a gap appearing at the overlapped cutting edges. With this invention, tipped milling cutters may be made up from a plurality of cutter segments to produce any desirable form in a slot or surface milled by such cutters. While the number of teeth on each segment is materially reduced over that normally employed to simplify the grinding and sharpen-operation, no time is lost thereby as the decrease in number of teeth is overcome by the increased speed of operation of the supporting arbor. The hardened tips on the teeth retain their cutting edges for a considerably longer period than the teeth of solid milling cutters made from tool steel and are capable of cutting faster and at a greater depth so as to reduce the time required to machine the slot or surface.

It is to be understood that, where the word "Carboloy" is employed throughout the description, the invention is not to be considered as being limited to tungsten carbide tips but that titanium carbide, Stellite, and other hard materials may also be utilized. It will also be noted that the interlocking cutting elements may be constructed exactly alike and thereafter have the body relieved, one on the right side, the other on the left side, or, when a third cutter is to be nested with the two cutters, to have the relief cut on both sides of the body thereof. When the cutters are nested together, the teeth thereof will overhang and will interlock relative to each other, so that one may be driven by the other when one is threaded on an arbor, as illustrated in Figs. 8 and 9. The space between the teeth and that provided by the position of the teeth to cut alternate sides of a slot provides large areas for chip clearance which prevents the tearing of the walls of the slot and damage to the cutter teeth.

What is claimed is:

1. A cutting tool of the milling type having a pair of washer-like body portions each portion provided with peripheral cutting teeth, the teeth on one of said body portions being spaced circumferentially from those on the other a sufficient amount to permit the teeth of one portion to be positioned between the teeth of the other portion when the body portions are assembled together and the teeth on one of said portions being displaced axially into overlapping position with respect to the teeth on the other portion to provide a driving interlock between the portions.

2. A cutting tool including, in combination, a pair of like cutting elements having a body portion and spaced circumferential teeth, the teeth on one element overhanging the right-hand face of its body portion, the teeth of the other element overhanging the left-hand face of its body portion, the arcuate length of the teeth being equal to that of the space therebetween, so that, when the adjacent faces of the elements abut, the teeth of the elements are in overlapping and interlocking relation to each other.

3. A composite milling cutter made of two washerlike body portions, each having cutting teeth thereon, the cutting teeth on one of said portions being spaced circumferentially from those on the other a sufficient amount to permit the teeth of one portion to be positioned between the teeth of the other portion when the body portions are assembled together, the teeth on one portion being axially overlapped with respect to the teeth of the other portion and received in circumferentially spaced recesses in the side of said other portion to form a driving interlock, said recesses being located radially inwardly of the cutting edges of the body portion in which they are formed.

THOMAS RALPH GOLDSMITH.